(12) United States Patent
Glennon

(10) Patent No.: US 6,344,983 B1
(45) Date of Patent: Feb. 5, 2002

(54) FLYBACK TRANSFORMER REGULATOR

(75) Inventor: Christopher Michael Glennon, Racine, WI (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/440,875

(22) Filed: Nov. 16, 1999

(51) Int. Cl.[7] .............................................. H02M 3/335
(52) U.S. Cl. ................. 363/21.12; 363/21.01
(58) Field of Search ............................. 363/20, 21, 95, 363/97, 131, 21.01, 21.12

(56) References Cited

U.S. PATENT DOCUMENTS

| | | | | |
|---|---|---|---|---|
| 4,612,610 A | * | 9/1986 | Farnsworth | 363/26 |
| 4,939,632 A | * | 7/1990 | Plagge et al. | 363/19 |
| 5,598,324 A | * | 1/1997 | Imamura et al. | 363/21 |
| 5,633,581 A | | 5/1997 | Takatori | 323/354 |
| 5,828,557 A | | 10/1998 | Sugaware et al. | 363/20 |
| 5,901,051 A | * | 5/1999 | Takahashi et al. | 363/21 |
| 5,903,452 A | * | 5/1999 | Yang | 363/97 |
| 5,923,173 A | | 7/1999 | Yu | 324/547 |
| 5,991,172 A | * | 11/1999 | Jovanovic et al. | 363/21 |

* cited by examiner

*Primary Examiner*—Matthew Nguyen
(74) *Attorney, Agent, or Firm*—Simon B. Anolick; Kenneth D. Labudda; Steven A. May

(57) ABSTRACT

A regulating circuit for a transformer is provided. The circuit includes at least a primary stage in association with a primary coil of a transformer and a secondary stage in association with a secondary coil of the transformer. Switching means are circuited to control current through the primary stage and a comparing means is provided in communication with the switching means. The comparing means compares voltage in the secondary stage with a desired value, and operates to open and close the switching means in accordance with this determination to result in a desired output voltage. Alternatively, the comparing means compares the voltage at the secondary stage with the voltage input to the primary stage. The comparing means operates to open the switching means when the voltage of the primary stage exceeds the input voltage. A method is also disclosed that includes the steps of determining a voltage at the primary stage circuit, determining a voltage at the secondary input, and comparing the voltages. The primary stage circuit may be opened to stop current flowing through the circuit when the voltage of the primary stage circuit exceeds the input voltage.

14 Claims, 1 Drawing Sheet

FLYBACK TRANSFORMER REGULATOR

BACKGROUND OF THE INVENTION

The present invention relates to transformers for increasing a voltage output. In particular, the invention is related to a circuit for regulating the output of a flyback transformer.

Generally, a transformer includes at least a pair of spaced-apart, turned coils of conducting wire. The coils are spaced so that the magnetic flux generated by the inductance of one coil may be coupled with the other coil. This mutual inductance transfers energy between the input, or "primary" coil and the coupled, or "secondary" coil. Multiple primary and secondary stages having differing coil windings may be linked to generate voltages or currents of differing magnitude, impedance levels or phase angles.

Flyback transformers are typically used in consumer electronics, radio transmission and automotive applications to develop increased voltages based on lower primary voltages fed to the primary coil. In automotive applications, in particular, a regulated voltage of approximately 5 volts DC is required to be produced from a variable input voltage.

In some transformer applications, the input voltage on the primary coil will vary and therefore tend to produce subsequent variations in the output voltage. This situation arises, for example, in automotive applications where power supplied by an exposed wet-cell battery may fluctuate depending on temperature, load and the age of the battery. In these situations, there are various circuits that may be utilized to regulate the output voltage of the transformer by controlling input into the primary. One example of such a regulator circuit is a pulse-width modulation circuit, wherein power to the primary may be switched on and off or otherwise modified according to a feedback signal taken from the primary or the secondary side of the transformer circuit, the battery voltage or the output current. This type of circuit requires generally continuous sensing of output voltage and current in order to be effective, and involves various sensing circuits which make the overall circuitry more complex. Other methods of controlling the secondary side output have included sensing the current in the primary and having a constant, regulated off time in the circuit to control output, or, in the alternative, a voltage sensing circuit in which a control loop (like that used in a pulse-width modulation circuit) is used to stabilize the output voltage based on the input voltage to the transformer.

SUMMARY OF THE INVENTION

According to the present invention, the circuit provided can control a flyback transformer power supply without utilizing complicated circuits, components or periodic sensing techniques. The circuit can control the transformer by removing the battery from the primary winding and thus preventing the generation of excessively high voltages in the secondary stage.

In one aspect of the present invention, a regulation circuit for a transformer is provided. The circuit includes at least a primary stage in association with a primary coil of a transformer and a secondary stage in association with a secondary coil of the transformer. Switching means is circuited to control the primary stage and a comparing means is provided in communication with the switching means. The comparing means compares voltage in the secondary stage with at least one voltage within the primary stage. The comparing means operates to open and close the switching means in accordance with these voltages to maintain a desired output voltage.

In another aspect of the invention, a regulating circuit for a flyback transformer is provided. The circuit includes at least a primary stage and a secondary stage. Switching means are provided within the primary stage to control power supplied to the primary stage as an input voltage. Primary voltage detection means are also provided to detect a voltage of the primary stage of the transformer, and secondary voltage detection means are also provided in communication with the secondary stage for detecting an output voltage at the secondary stage of the transformer. Primary current detection means are also provided to detect current in the primary. The circuit also includes comparing means in communication with the switching means. The comparing means compares the values read by the primary and secondary detection means, and operates to open the switching means when the voltage of the primary stage exceeds the input voltage or the primary current detected exceeds a desired value.

The invention may also be embodied in a method of regulating a transformer having at least a primary stage circuit and a secondary stage circuit. The method includes the steps of determining a voltage at the primary stage circuit, determining a voltage at the input of the primary stage circuit, and comparing the voltages in a comparing means. The primary stage circuit may be opened to stop current flowing through the circuit when the voltage of the primary stage circuit exceeds the input voltage. Furthermore, the primary stage circuit is also opened if the current detected in the primary exceeds a desired value, or if the voltage in the secondary exceeds a desired value.

It is to be understood that both the foregoing general description and the following detailed description are exemplary and explanatory and are intended to provide further explanation of the invention as claimed. The invention, together with further objects and attendant advantages, will best be understood by reference to the following detailed description, taken in conjunction with the accompanying drawings.

DETAILED DESCRIPTION OF THE PREFERRED EMBODIMENTS

Preferably, the disclosed embodiment of the invention is implemented in automotive applications which utilize a wet-cell battery power supply. As noted above, because such a power supply has output variations depending on temperature, load and amount of discharge, a flyback regulator circuit is required to maintain and generate a generally constant power output for use by other automotive components.

Figure 1:
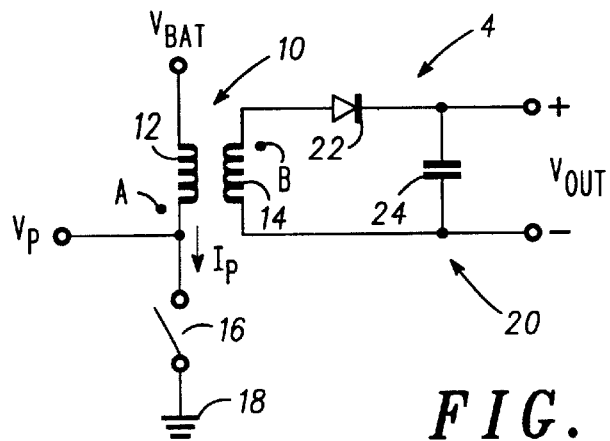
FIG. 1 is a schematic circuit diagram showing a typical flyback transformer circuit as utilized in the present invention.

FIG. 1 shows a schematic diagram of a circuit 4 for a typical flyback transformer implemented in the present invention. As shown in the Figure, a transformer 10 includes a primary coil 12 and a secondary coil 14. $V_{BAT}$ is the voltage supplied by a power source, and $V_P$ is a voltage detection point for the primary coil 12 in a primary circuit 16. The primary circuit 16 includes a switch 18 to control current through the coil 12. On the secondary side, the secondary circuit 20 includes a diode 22 and a capacitor 24 linked to the reverse-wound secondary coil 14. Two voltage reference points are provided on the transformer 10 in the diagram; namely, point A is used to refer to voltage on the primary coil 12 and point B is used as a reference point on secondary coil 14.

Figure 2:
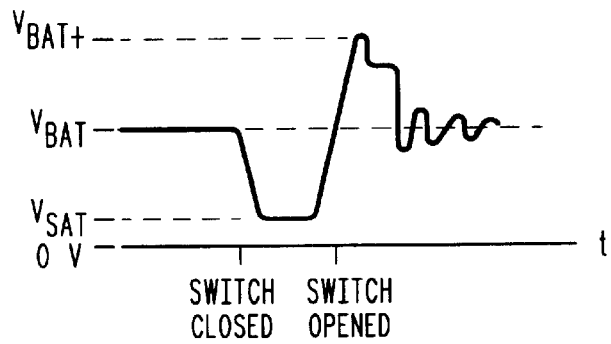
FIG. 2 is a waveform diagram illustrating the operation of the typical flyback transformer circuit shown in FIG. 1.

FIG. 2 shows an operational wave form for the primary side of the flyback transformer shown in FIG. 1 and implemented in the present invention. The wave form shows voltage levels detected at point A plotted against time. As shown, $V_{BAT}$ is the voltage supplied by a power source such as a car battery. Initially, the voltage applied to the primary coil 14 is zero and the switch 16 is open. Thus, the current in the primary is zero and the current in the secondary is zero. When the switch 16 is closed, the battery voltage is applied to the primary coil 14 and the current in the primary coil 14 ramps up. The diode 22 in the secondary side 32 blocks the flow of current in the secondary, so the secondary current remains at zero during the charging of the primary coil 14. When the primary current reaches a desired value, the switch 16 opens.

When the switch 16 opens, energy is transferred from the primary coil 12 to the secondary coil 14. This voltage is seen at the peak in the graph of FIG. 2, which comprises the battery voltage $V_{BAT}$ plus the output voltage and the voltage drop across the diode 22. At this point, the diode 22 turns on and the secondary coil 14 dumps current into the capacitor 24. This produces a regulated output voltage $V_{OUT}$. After all the energy is transferred from the secondary coil 14 to the output capacitor 24, the voltage at reference point A drops to the level of $V_{BAT}$. Then the switch may be closed again to recharge the primary coil 12.

Figure 3:
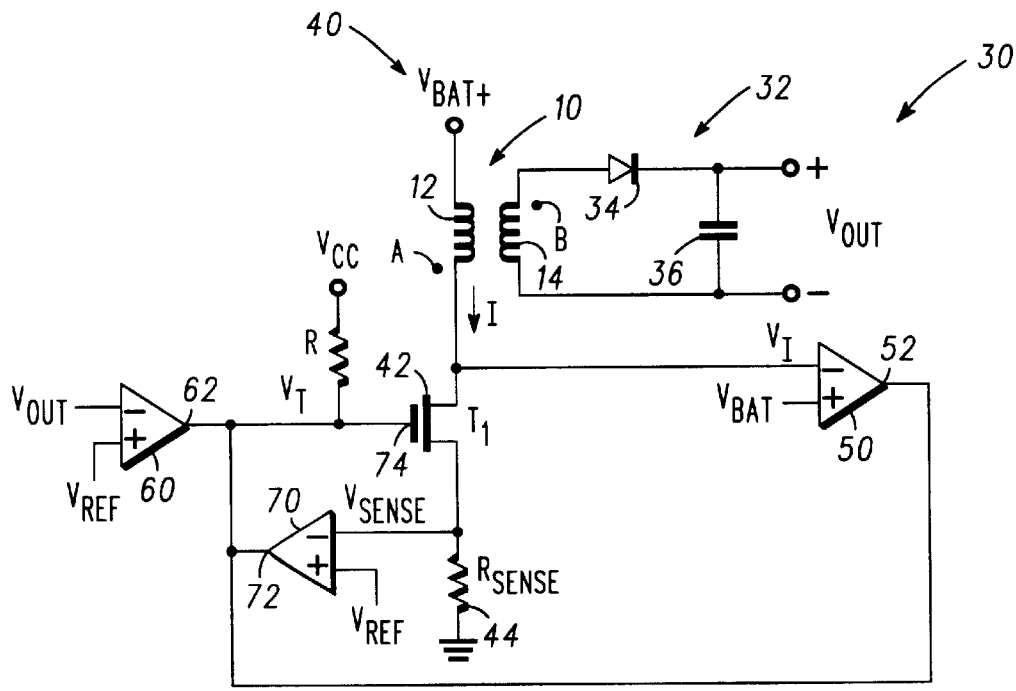
FIG. 3 is a schematic circuit diagram showing a preferred embodiment of the present invention, which implements the circuit of FIG. 1.

FIG. 3 shows a schematic diagram of a regulator circuit for a flyback transformer of the present invention. As shown in the diagram, which refers to similar flyback transformer components from FIG. 1, the circuit 30 preferably includes a transformer 10 having a primary coil 12 and a secondary coil 14. The secondary coil 14 is preferably wound in the reverse direction of the primary coil 12. Similar to FIG. 1, coil voltage reference points A and B are provided on the diagram. On the secondary side of the circuit 30, a secondary circuit 32 preferably includes a diode 34 linked to the secondary coil 14 and a standard capacitor 36 across the output $V_{OUT}$ of the circuit 32. On the primary side of the circuit 30, a primary circuit 40 includes as a preferred switching means a standard n-channel MOSFET transistor 42 having its drain linked to the primary coil 12. Other types of switches may of course be substituted, such as a relay, semiconductor transistor or optical switch, for example. The transistor source is further linked to a sense resistor 44.

The preferred embodiment ensures that a desired output voltage is maintained despite fluctuations in the battery voltage. The primary circuit 40 serves to create a magnetic field in the primary coil 12, which, in turn, induces a magnetic field in the secondary coil 14. When the transistor 42 is on, current ramps up through the primary coil 12 and through the sense resistor 44. The flowing current on the primary side creates a magnetic field in the primary coil 12. The diode 34 in the secondary circuit 32 blocks the flow of current in the secondary side while the transistor 42 is gated on. When the transistor 42 is gated off, the magnetic field in the primary coil 12 transfers flux to the reverse-wound secondary coil 14. The magnetic field induced in the secondary coil 14 creates a current flow in the clockwise direction as shown in relation to the diode 34, which is dumped to the capacitor 36. The capacitor 36 charges and maintains the desired output voltage $V_{OUT}$.

Regulation of the transformer 10 is preferably provided by a plurality of comparators which implement a unique logic to sense the voltage on the primary coil 12 to determine when the current in the secondary coil 14 has gone to zero. The comparators also ensure that the output voltage $V_{OUT}$ is below a set level. In particular, point A of the primary coil 12 is provided as an input into a first comparator 50. As shown, the output 52 of comparator 50 is linked to the outputs 62 and 72 of two other comparators 60 and 70, respectively. Comparator 60 receives as an input the output $V_{OUT}$ of the secondary circuit 32. Comparator 70 receives as its input a voltage above the sense resistor 44 ($V_{SENSE}$). Comparators 60 and 70 both have positive voltage inputs linked to an upper-limit reference voltage $V_{REF}$. The $V_{REF}$ voltages input into comparators 70 and 60 are not necessarily the same voltage. For example, in the present application, $V_{REF}$ for the comparator 70 may be small (0.1 volts) and $V_{REF}$ for the comparator 60 may be 5 volts. $V_{REF}$ for the comparator 60 could be the same value as for the comparator 70 if the $V_{OUT}$ signal is sufficiently stepped down. Comparator 50 is linked to $V_{BAT}$. The linked outputs of comparators 50, 60 and 70 are provided to the gate 74 of the transistor 42.

In general, in a flyback circuit, when point A of the primary coil 12 is at a voltage equal to battery voltage, the output current and voltage $V_{OUT}$ is at a stable voltage due to the stabilizing affect of the capacitor 36. In the preferred embodiment, comparator 50 measures this primary coil voltage as an input $V_I$ and compares it with the $V_{BAT}$. As long as the voltage $V_I$ is less than or equal to $V_{BAT}$, the output 52 of the comparator 50 will be high and the transistor 42 will be kept on so that current will continue to ramp up in the primary coil 12. Furthermore, to ensure that the current in the primary side 40 is sufficiently ramped up to a desired level when the transistor 42 is gated on, comparator 70 reads the voltage above sense resistor 44 as an input and compares it to the reference voltage $V_{REF}$. As the voltage $V_{SENSE}$ is ramped up along with the current 1, the comparator 70 maintains a high output through the output 72 of the comparator 73. Finally, the comparator 60 verifies the presence of the output voltage $V_{OUT}$ from the secondary side 30. $V_{OUT}$ is fed as an input to the comparator 60, which verifies that $V_{OUT}$ is below the $V_{REF}$. If this condition is met, the comparator provides a high output from output 62.

In order to maintain the desired output voltage, the transistor 42 must be switched on and off properly. The transistor 42 is controlled by the three comparators 50, 60, and 70 in the primary circuit 30. The comparator 50 senses the voltage at point A in the circuit 30 and verifies with a high voltage output signal at 52 that the coil voltage is still below the voltage of the battery $V_{BAT}$. For the transistor 42 to be on, all three comparators 50, 60 and 70 must output a high voltage signal from their outputs 52, 62 and 72, respectively. Thus, for the transistor to be on and current in the primary to build up, $V_{OUT}$ must be less than $V_{REF}$, $V_I$ must be less than $V_{BAT}$, and $V_{SENSE}$ must be less than $V_{REF}$.

In the initial state, all three high voltage conditions will be met and the transistor 42 will be turned on. After sufficient current flows through the transistor 42, $V_{SENSE}$ as input into the comparator 70 will be greater than $V_{REF}$, and the low output from comparator 70 at output 72 will cause the voltage of the gate 74 of transistor 42 to be low, thus turning the transistor 42 off. At this point, the magnetic field of the primary coil 12 will transfer into the secondary coil 14, thereby creating a current in the secondary side 32 that charges the capacitor 36. This ensures a stable output voltage at $V_{OUT}$.

When the transistor 42 turns off, the $V_{SENSE}$ high voltage output condition at comparator 70 is met because current is flowing through the secondary side of the circuit. $V_I$ is in turn met when the current in the secondary reaches zero as detected by comparator 50. However, the $V_{OUT}$ condition at comparator 60 is not met until the capacitor 36 loses enough charge such that it cannot produce the desired output voltage. As soon as $V_{OUT}$ sufficiently discharges from the capacitor 36, the $V_{OUT}$ condition, wherein the output voltage from the secondary circuit 32 becomes less than the reference voltage $V_{REF}$, the condition at comparator 60 is now met and the voltage at the gate of the transistor 42 is large enough to turn the transistor 42 on. This cycle thus repeats to regulate the output current and voltage.

The present invention allows the output voltage to be regulated easily for any set voltage in the primary circuit 40. In this regard, the sensing circuitry does not rely on a specific setting for a variable input voltage on the primary coil 12. Input for the circuits may be taken from a variety of points, including current in the primary or secondary, the voltage at the coil (point A) or the output voltage $V_{OUT}$. This is particularly useful in automotive applications where input battery voltage $V_{BAT}$ may vary significantly over time. The system simply ramps up to whatever set rate of current is in the primary circuit, and then starts over again when the energy has been depleted from the capacitor on the secondary side 32. Thus, the system may work with only a minimum of settings or adjustments, unlike prior art feedback, pulse-width modulation or constant on/off time circuits.

In the present embodiment, the transistor 42 is an MTD3055EL transistor manufactured by Motorola. The comparators are preferably Model LM2903 comparators manufactured by Motorola. These parts may be assembled as discrete components, or equivalent parts may be produced in a custom-made integrated circuit. The sense resistor 44 is a 0.1 ohm resistor type manufactured by Rohm. There are many equivalent components and circuits that may be provided to perform the equivalent function or have a similar structure.

Of course, it should be understood that wide range of changes and modifications can be made to the preferred exemplary embodiment described above. Thus, it is intended that the foregoing detailed description be regarded as illustrative rather than limiting, and that it be understood that it is the following claims, including all equivalents, which are intended to define the scope of this invention.

What is claimed is:

1. A regulating circuit for a transformer, said circuit having at least a primary stage in association with a primary coil of said transformer and a second stage in association with a secondary coil of said transformer, said circuit comprising:
   switching means linked to said primary coil and circuited to control current through said primary stage;
   first comparing means in communication with said switching means for comparing a voltage through said transformer with an input voltage to said transformer, wherein said voltage through said transformer is determined prior to said switching means; and
   wherein said first comparing means operates to open and close said switching means to result in a desired output voltage across said secondary coil.

2. The regulating circuit of claim 1 further comprising second comparing means in communication with said switching means for comparing a current measured in the primary stage with at least one desired value;
   wherein said second comparing means operates to open and close said switching means to result in a desired output voltage across said secondary coil.

3. A method of regulating circuit for a transformer having at least a primary stage circuit and a second stage circuit, wherein said primary stage circuit comprises a switching device linked to a primary coil and said second stage circuit comprises a secondary coil, and wherein said method comprises steps of:
   determining a voltage value through said transformer, wherein said voltage through said transformer is determined prior to said switching device;
   comparing the voltage value of said transformer with an input voltage to said primary stage circuit; and
   opening said primary stage circuit to stop current flow therethrough when said voltage value of said input voltage exceeds said voltage value through said transformer.

4. The method of claim 3 further comprising the steps of:
   closing said primary stage circuit to allow current flow therethrough when said voltage value approaches zero.

5. The method of claim 4 wherein said step of opening said primary stage circuit is performed by a transistor.

6. The method of claim 5 wherein said step of comparing the voltage values is performed by a plurality of comparators linked to the gate of said transistor.

7. The method of claim 6 wherein said transformer includes a primary coil linked to said primary stage circuit and a secondary coil linked to said secondary stage circuit.

8. The method of claim 3 further comprising the step of opening said primary stage circuit when said voltage of said primary stage circuit exceeds an input voltage to said primary stage.

9. A regulating circuit for a transformer, said circuit including a primary coil and a secondary coil, said circuit comprising:
   a primary stage circuit linked to said primary coil and a secondary stage circuit linked to said secondary coil;
   at least one transistor circuited to control current through said primary coil;
   a first comparator linked to the gate of the transistor comparing a voltage in said secondary stage with at least one voltage within said primary stage;
   a second comparator linked to the gate of said transistor comparing a current measured in the primary stage with at least one desired value; and
   a third comparator linked to the gate of said transistor comparing a voltage measured through the transformer with an input voltage to the transformer, wherein said voltage through said transformer is determined prior to said transistor;
   wherein said first, second and third comparators cooperate to enable and disable said transistor to result in a desired output voltage across said secondary coil.

10. The regulating circuit of claim 1 further comprising:
    a second comparing means in communication with said switching means for comparing a voltage in said secondary stage with at least one voltage within said primary stage;
    wherein said second comparing means operates to open and close said switching means to result in a desired output voltage across said secondary coil.

11. The regulating circuit of claim 1 further comprising:
    a third comparing means in communication with said switching means form comparing the current through said primary stage with at least one voltage within said primary stage;

wherein said third comparing means operates to open and close said switching means to result in a desired output voltage across said secondary coil.

12. The regulating circuit of claim 1 wherein said first comparing means opens said switching means when said voltage through said transformer exceeds said input voltage.

13. The method of claim 3 further comprising the steps of:

determining the current value at the primary stage; and comparing the current value of said primary stage with a first desired value;

wherein said primary stage circuit to stop current flow therethrough when said current value of said primary stage exceeds said first desired value.

14. The method of claim 3 further comprising the steps of:

determining the voltage value at said secondary stage circuit; and comparing the voltage value of said secondary stage with a second desired value;

wherein said primary stage circuit to stop current flow therethrough when said voltage of said secondary stage exceeds said second desired value.

* * * * *